United States Patent
Cortez et al.

(10) Patent No.: US 6,837,262 B2
(45) Date of Patent: Jan. 4, 2005

(54) NON TANK PRESSURIZING FAST FILL RECEIVER AND SYSTEM FOR VEHICLES

(75) Inventors: Jose Cortez, La Puente, CA (US); David Wicke, Huntington Beach, CA (US)

(73) Assignee: Adel Wiggins Group, Los Angeles, CA (US)

( * ) Notice: Subject to any disclaimer, the term of this patent is extended or adjusted under 35 U.S.C. 154(b) by 175 days.

(21) Appl. No.: 10/052,909

(22) Filed: Jan. 15, 2002

(65) Prior Publication Data

US 2003/0131888 A1 Jul. 17, 2003

(51) Int. Cl.$^7$ .............. F15C 1/14; F16K 21/18; F16L 29/04; F16L 37/30
(52) U.S. Cl. .............. 137/393; 137/2; 137/15.16; 137/386; 137/614.05; 137/842; 141/198; 141/346; 141/349; 141/351; 251/149.6
(58) Field of Search .............. 137/2, 15.16, 842, 137/389, 390, 393, 587, 614.05, 614.19, 386; 251/149.6; 141/198, 346, 348, 349, 350, 351

(56) References Cited

U.S. PATENT DOCUMENTS

| | | | | |
|---|---|---|---|---|
| 2,646,817 A | * | 7/1953 | Cox et al. | 137/393 |
| 2,735,696 A | * | 2/1956 | Omon et al. | 137/614.05 |
| 3,156,271 A | | 11/1964 | Schnurmann | 141/210 |
| 3,174,503 A | * | 3/1965 | Absolon | 137/393 |
| 3,269,404 A | * | 8/1966 | Lebow | 137/393 |
| 3,335,746 A | * | 8/1967 | Lebow | 137/393 |
| 3,363,641 A | * | 1/1968 | Mylander | 137/393 |
| 3,561,465 A | * | 2/1971 | De Graaf | 137/386 |
| 3,587,622 A | | 6/1971 | Hardison | 137/220 |
| 3,590,886 A | * | 7/1971 | Judd | 137/386 |
| 3,662,793 A | | 5/1972 | Calisher et al. | 141/198 |
| 3,674,061 A | | 7/1972 | Calisher et al. | 141/198 |
| 3,703,907 A | * | 11/1972 | Richards | 137/386 |
| 4,006,762 A | * | 2/1977 | Badger | 137/386 |
| 4,024,887 A | * | 5/1977 | McGregor | 137/386 |
| 4,161,188 A | | 7/1979 | Jorgensen | 137/393 |
| 4,191,208 A | * | 3/1980 | Mylander | 137/393 |
| 4,312,373 A | * | 1/1982 | Tilling et al. | 137/393 |
| 4,327,770 A | * | 5/1982 | Brown et al. | 137/614.05 |
| 4,515,178 A | * | 5/1985 | Campau | 137/393 |
| 4,919,174 A | | 4/1990 | Warland | 141/198 |
| 5,285,812 A | | 2/1994 | Morales | 137/393 |
| 6,009,901 A | * | 1/2000 | Roberts | 137/614.05 |
| 6,354,564 B1 | * | 3/2002 | Van Scyoc et al. | 251/149.6 |

* cited by examiner

Primary Examiner—George L. Walton
(74) Attorney, Agent, or Firm—Fulwider Patton Lee & Utecht, LLP

(57) ABSTRACT

A refueling system for vehicles including a dual valve receiver connected in fluid communication with the fuel tank, and a jet sensor inside of the fuel tank and in fluid communication with the receiver. The refueling system further includes a relief valve vent in fluid communication with the fuel tank to vent the fuel tank and to relieve pressure that may otherwise build up inside the fuel tank during refueling. When refueling with an automatic shutoff nozzle, the sensor detects when a desired fuel level has been reached, and then informs the receiver to prevent fuel flow into the tank. When this occurs, the pressure inside the receiver and automatic shutoff nozzle increases, causing the nozzle to shut off automatically.

7 Claims, 3 Drawing Sheets

NON TANK PRESSURIZING FAST FILL RECEIVER AND SYSTEM FOR VEHICLES

BACKGROUND OF THE INVENTION

This invention relates generally to a refueling system and receiver, and more specifically to a dual valve receiver designed to support automatic shutoff fast fill refueling of vehicles without pressurizing the fuel tank.

Large vehicles are depended on in such industries as mining and heavy construction, and need to be refueled as quickly as possible in order to keep work productivity high. These large construction vehicles need and have large fuel tanks ranging up to 1200 gallons and larger, which require fast fill systems to quickly pump a large volume of fuel into these large tanks. Currently, refueling receivers work in conjunction with fast fill automatic shutoff nozzles that require tank back pressure build up in order for them to shutoff. In order to use a pressurized refueling system, the fuel tanks have to be structurally designed to withstand internal pressures of up to 10 psi. This current system can therefore not be utilized in lighter machinery, with lighter constructed fuel tanks, that can benefit from fast fill refueling. Another current method of refueling involves filling a fuel tank with a release or spill valve which allows excess fuel to spill out of the tank when it is full, indicating to an operator to shut the fuel flow off.

Recent environmental laws and the necessity to avoid the chance of large amounts of fuel being collected around a refueling station, makes such approaches increasingly undesirable, apart from the wasted fuel, which is, of course, undesirable as well. Thus, it would be highly desirable to provide an automated fuel delivery system for large vehicles which is capable of tapping off fuel tanks while avoiding over-pressurization of the tanks and fuel spills. The present invention addresses these and other concerns.

SUMMARY OF THE INVENTION

The present invention is directed to a non pressurizing tank fast fill system, using a dual valve receiver in connection with a sensor, and is designed to support automatic shutoff fast fill refueling of vehicles.

The present refueling system for vehicles includes a receiver joined in fluid communication with a fuel tank, and a sensor that is connected to the receiver and exposed inside the fuel tank for sensing a predetermined level of fuel within the fuel tank. Together, the receiver and sensor help prevent over- and under-filling of the fuel tank. There is also a relief valve vent in fluid communication with the fuel tank to vent the tank, and to relieve any built up pressure that may result during refueling. Further, an automatic shutoff nozzle can be used in connection with the receiver.

It is preferred that the receiver be a dual valve receiver having a receiver body with an inlet and an outlet. There is a first valve disposed in a first chamber inside the receiver body, and the first valve is biased toward a closed position sealing the inlet, being movable between the closed position and an open position allowing fuel to flow into the receiver body. In order to direct fuel to the sensor and back, the receiver body includes a sensor fuel path and a return fuel path, both being in fluid communication with the sensor. A main fuel path is in fluid communication with the inlet and outlet and provides a path for the fuel to flow into the fuel tank. Also disposed in the receiver body is a second chamber that is in fluid communication with the return fuel path, and a second valve having a first end and a second end. The sensor is connected in fluid communication between the first chamber and the second chamber. The first end of the second valve is disposed inside the second chamber, and the second valve is biased toward a closed position with the second end sealing the outlet of the receiver body. The second valve is moveable between the closed position and an open position allowing fuel to enter the fuel tank through the main fuel path.

With the present refueling system as described, a method of refueling the fuel tank includes, first, connecting the automatic shutoff nozzle to the receiver, causing the first valve to open, and dispensing from the nozzle into the receiver. The receiver directs a portion of the fuel via a conduit to the sensor, and the fuel is then directed via a second conduit back to the receiver, where the fuel enters and pressurizes the second chamber in the receiver. The sensor is thus operative to pressurize the second chamber when fuel is below the predetermined level of fuel within the fuel tank, and operative to not pressurize the second chamber when fuel is at or above the predetermined level of fuel within the fuel tank. Pressurizing the second chamber causes the second valve to open which allows fuel to flow along the main fuel path of the receiver and into the fuel tank. Once the fuel in the fuel tank reaches the sensor, the fuel interrupts the flow of fuel through the sensor, causing a pressure decrease in the second chamber, which closes the second valve. Once the second valve is closed, an increase of pressure results inside the receiver and nozzle, causing the nozzle to automatically shutoff. Thus, fuel is permitted to flow through the outlet of the receiver when the fuel is below the predetermined level of fuel within the fuel tank, and because the nozzle is automatically shutoff, the fuel is not permitted to flow through the outlet of the receiver when the fuel is at or above the predetermined level.

Other features and advantages of the present invention will become apparent from the following detailed description taken in conjunction with the accompanying drawings which illustrate, by way of example, the principles of the invention.

DETAILED DESCRIPTION OF THE PREFERRED EMBODIMENTS

The present invention includes a dual valve receiver, a sensor, and a vent which together offer a means of refueling vehicles with an automatic shutoff nozzle, without pressurizing the fuel tank of the vehicle or overfilling the fuel tank.

Figure 1:
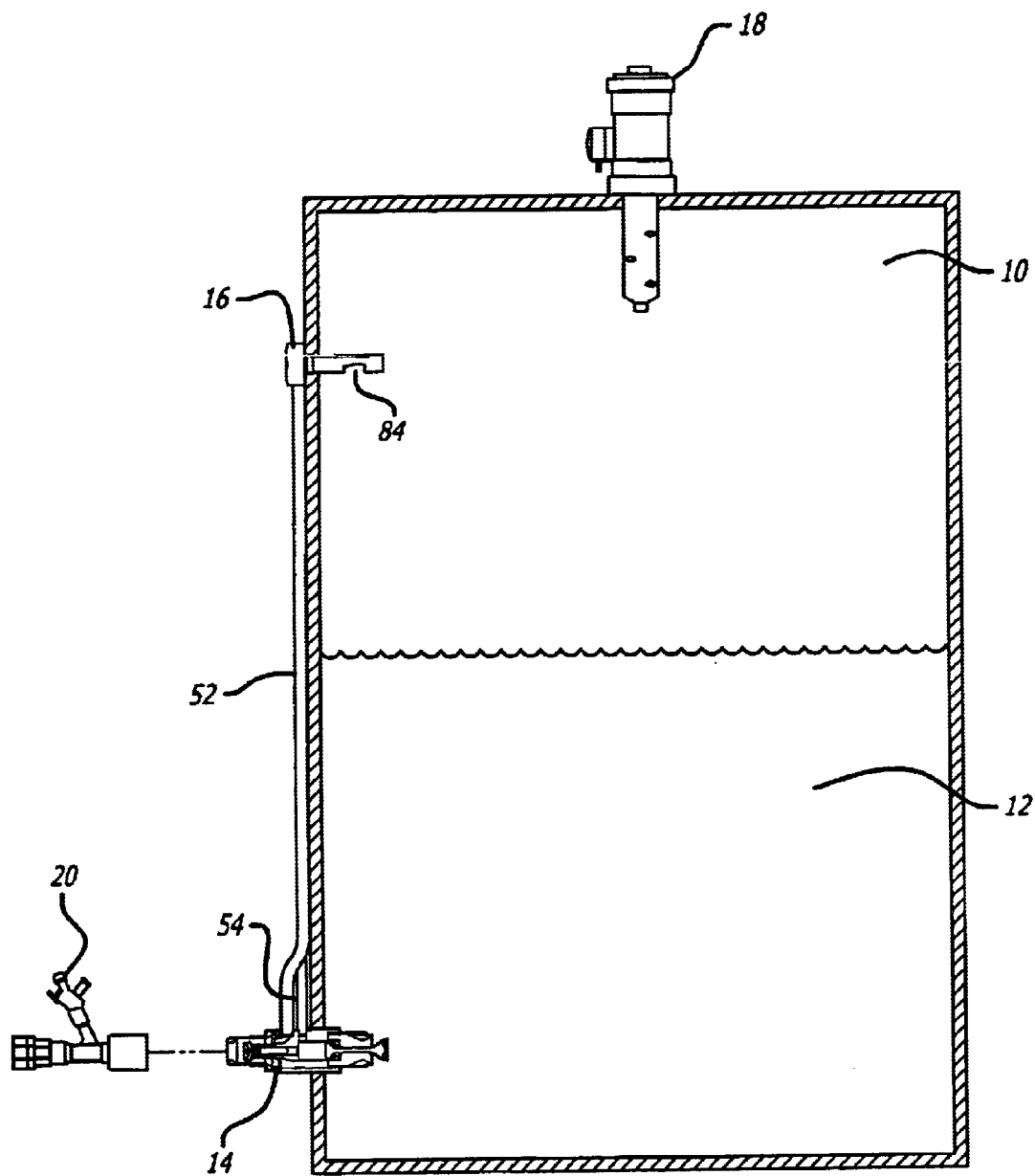
FIG. 1 is a partial cross-sectional elevational view of the present non tank pressurizing fast fill system.

A refueling system according to the invention for vehicles, such as large mining or construction vehicles or off-road vehicles, for example, can be seen in FIG. 1. A fuel tank is generally designated 10, and the fuel inside the tank is designated 12. There is a receiver 14, connected in fluid communication with the fuel tank 10, and a sensor 16, such as a jet sensor, for example, connected to the receiver 14 and exposed inside the fuel tank 10 to detect the level of the fuel 12. Other types of sensors may also be suitable. There is also a relief valve vent 18, in fluid communication with the fuel tank 10 to vent the fuel tank and to relieve any extra air pressure that may build up inside the tank. An example of such a vent is an Adel Wiggins ZV series vent. A refueling nozzle 20 is also seen in FIG. 1, the nozzle is in fluid communication with a fuel source and forms a removable connection with the receiver 14. In this embodiment, the refueling nozzle 20 is an automatic shutoff nozzle, such as the Adel Wiggins ZZ9A1 refueling nozzle, which automatically shuts off when pressure inside the receiver 14 and nozzle reaches a threshold level.

Figure 2:
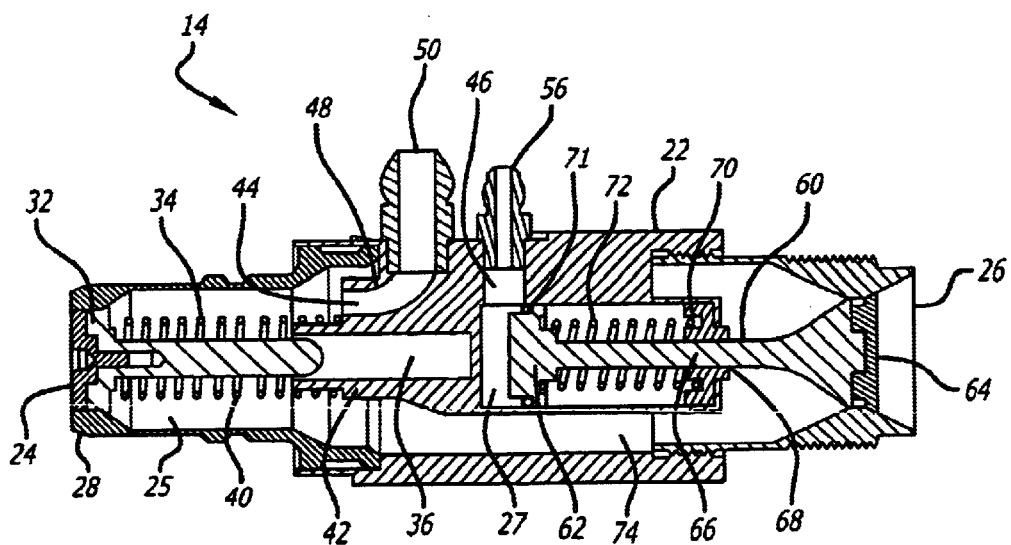
FIG. 2 is cross-sectional elevational view of the present dual valve receiver in the closed position.
Figure 3:
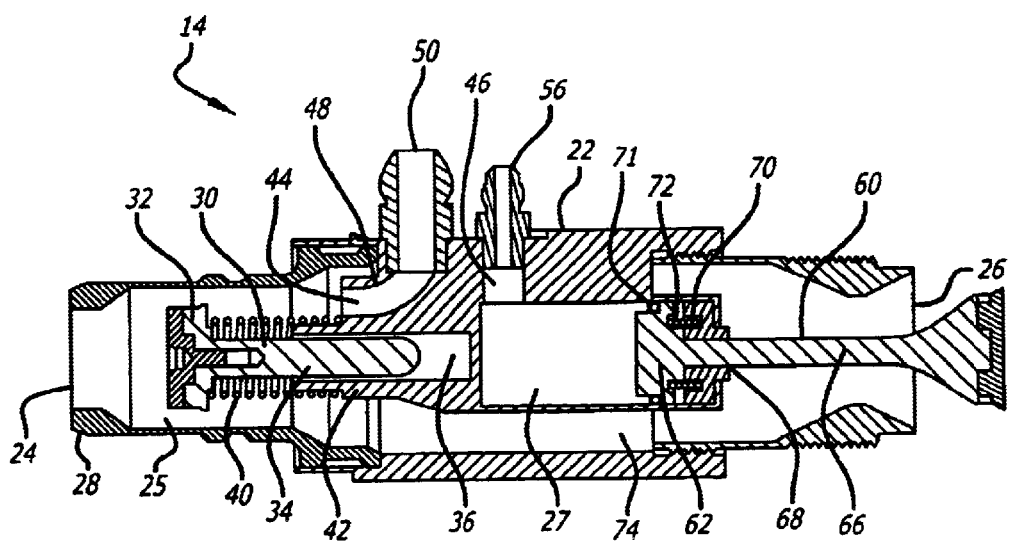
FIG. 3 is a cross-sectional elevational view of the present dual valve receiver in the open position.

As best seen in FIGS. 2 and 3, an embodiment is shown where the receiver 14 is a dual valve receiver having a receiver body 22 with an inlet 24 and an outlet 26, and a first chamber 25 and a second chamber 27. There is a nipple interface 28 at the inlet 24 which connects to the refueling nozzle 20. A first valve 30 is disposed inside the receiver body 22, being biased toward a closed position, sealing the inlet 24, and is movable between the closed position and an open position allowing fuel to flow into the receiver body. The first valve 30 has a nipple poppet 32 which seals the inlet 24, and a post 34 in connection with the nipple poppet that is slidingly mated in a recess 36. The first valve 30 is biased with a first spring 40 that encircles a portion of the post 34, and is fitted against the nipple poppet 32 at one end of the spring and a wall 42 of the recess 36 at the other end.

Also located in the receiver body 22 is a sensor fuel path 44 and a return fuel path 46, both being in fluid communication with the sensor 16. In this embodiment, the sensor fuel path 44 includes an integrated Pitot tube 48 that leads to a jet pick-up fitting 50 that is connected to the receiver body 22. The jet pick-up fitting 50 is connected to a sensor hose 52 (seen in FIG. 1) which leads fuel to the sensor 16. Once the fuel is channeled through the sensor 16, a return hose 54 (seen in FIG. 1) leads the fuel from the sensor 16 back to the receiver 14. The return hose 54 is connected to the receiver body 22 with a jet return fitting 56 which is part of the return fuel path 46. The return fuel path 46 is in fluid communication with the second chamber 27 disposed inside the receiver body 22. A diameter of the jet pick-up fitting 50 and the sensor hose 52 can be manufactured to be larger than a diameter of the jet return fitting 56 and return hose 54, in order to facilitate and sustain the pressure increase in the second chamber 27 when fuel follows the sensor fuel path 44 and the return fuel path 46. This idea is best shown in FIGS. 2 and 3.

The integrated Pitot tube 48 is the component that facilitates the pressure build up to control the opening and closing of the receiver 14. First, the Pitot tube 48 helps direct the incoming flow through the jet pick-up fitting 50 to initiate pressurization of the second chamber 27. In addition to directing the fuel flow, the Pitot tube 48 also captures the dynamic pressure from the incoming fuel and when added to the static pressure helps maintain the pressure in the second chamber 27 to open the second valve of the receiver 14.

The receiver 14 also includes a second valve or piston shuttle 60 having a first end 62 and a second end 64, with the ends connected by a shaft 66. The first end 62 is disposed inside the second chamber 27, and the shaft 66 is fitted through an opening 68 of the second chamber. The second chamber 27 has a guide 70 located around the opening 68 to guide the shaft 66 of the second valve 60 as it moves between open and closed positions. Attached to the first end 62 of the second valve 60 is a seal 71 which prevents fuel from escaping the inside the second chamber 27, and therefore serves to maintain the pressure the fuel creates inside the second chamber. In one embodiment, the seal 71 is a spring energized seal, however most types of seals known in the art, including o-rings or the like may be used. As seen in FIG. 2, the piston shuttle 60 is biased in a closed position by a second spring 72, with the second end 64 sealing the outlet 26 of the receiver body 22. The second spring 72 is affixed to the first end 62 of the piston shuttle 60 and to the guide 70 inside the second chamber 27. The piston shuttle 60 is the flow control mechanism of the receiver 14, and is moveable between the closed position and an open position. The open position is shown in FIG. 3, and it allows fuel to enter the fuel tank through a main fuel path 74 which is in fluid communication with the inlet 24 and outlet 26.

When the second chamber 27 is pressurized, the pressurized fuel displaces the piston shuttle 60 from its initial closed position to the open position allowing fuel 12 to fill the tank 10. As the fuel 12 within the fuel tank 10 begins to rise, it reaches the level where the fuel flow through the sensor 16 is interrupted. Once the interruption occurs, the pressure build up within the return fuel path 46 and second chamber 27 decreases, and the piston shuttle 60 begins to close once the second spring 72 overcomes the pressure in the second chamber.

Figure 4:
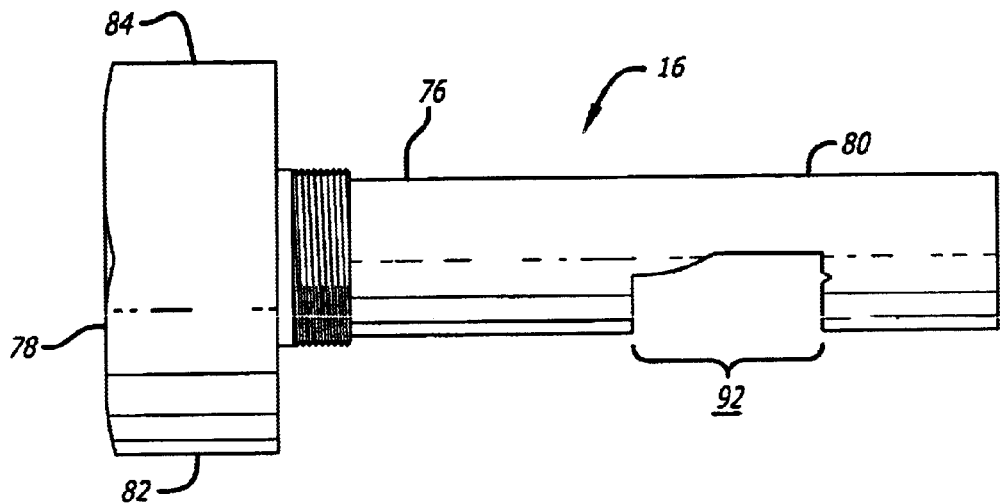
FIG. 4 is an elevational view of the sensor.
Figure 5:
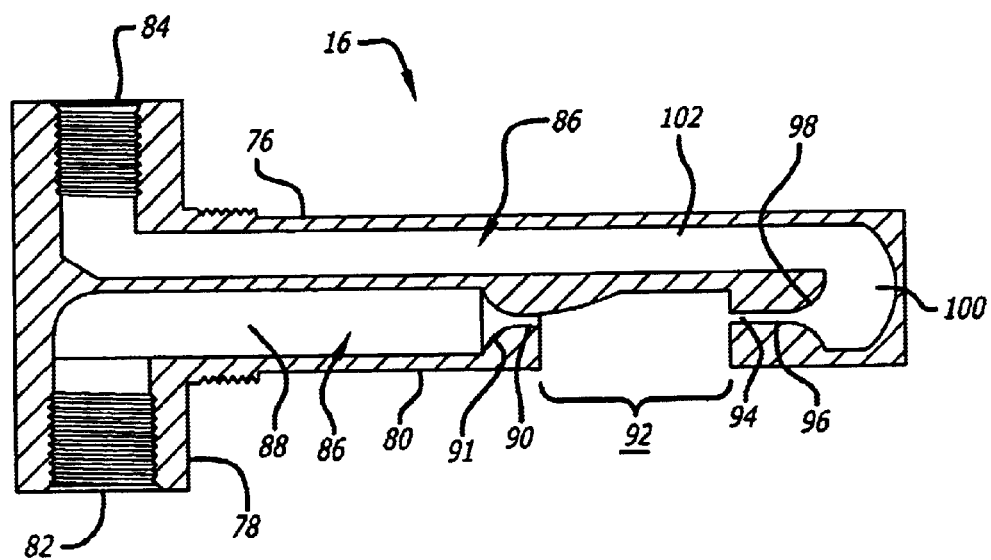
FIG. 5 is a cross-sectional elevational view of the sensor.

Now referring to FIGS. 4 and 5, the sensor 16 or more particular the jet sensor, has a sensor body 76 with a base section 78 and a stem section 80. In this embodiment, the base section 78 includes a sensor inlet 82 and a sensor outlet 84 disposed at opposite ends of the base section, although positioning of the inlet and outlet may vary. To facilitate an increased pressure flow of fuel, the diameter of the sensor inlet 82 is larger than the diameter of the sensor outlet 84. The sensor inlet 82 may include a flared or flareless mating fitting of thread size 0.750–16 UNJ to connect the sensor hose 52, and the sensor outlet 84 may include a flared or flareless mating fitting of thread size 0.4375-20 UNJF to connect the return hose 54. The fittings of the sensor inlet 82 and outlet 84 may vary in size, and additional fittings may be added to the sensor inlet 82 and outlet 84 in order to direct the connecting sensor hose 52 and return hose 54 in a specific direction.

As best seen in the cross-sectional view of FIG. 5, a fuel channel 86 is formed in the jet sensor 16, and has a first section 88 which receives fuel from the sensor inlet 82, and directs the fuel to an outlet orifice 90. There is a tapered section 91 which funnels fuel from the first section 88 out through the outlet orifice 90, where the fuel then shoots across a cutout section 92 and into an inlet orifice 94. The inlet orifice 94 leads the fuel first into a narrow path 96 that widens at a tapered section 98, and then the fuel enters a transition section 100. At the transition section 100 the fuel completes a U-turn and enters a second section 102, that is disposed above the first section 88, and flows out through the sensor outlet 84. The cutout section 92 disposed on the stem section 80 exposes the stream of fuel between the outlet orifice 90 and the inlet orifice 94 to the contents of the fuel tank 10. The cutout section 92 in this embodiment is about 1.13 inches in length, and 0.89 inches in width, which is also the width of the stem section 80.

The sensor operates to pressurize the second chamber when fuel is below the predetermined level of fuel within the fuel tank, and to not pressurize the second chamber when fuel is at or above the predetermined level of fuel within the fuel tank. Once the fuel level 12 in the fuel tank 10 reaches the cutout section 92, the stream of fuel from the outlet orifice 90 to the inlet orifice 94 will be interrupted and submerged by the fuel in the tank, thereby stopping the transmission of velocity head or pressure to the narrow path 96 and transition section 100. There will then be a pressure decrease in the second path 102, return hose 54, and second chamber 27, causing the piston shuttle 60 to close off the fuel flow into the tank. The interruption of the fuel stream followed by the decrease of pressure in the second chamber 27 results in accurate refueling of the tank 10 without under- or over-filling. The cutout section 92 is the detection means in this embodiment, however, other means to interrupt the fuel flow in the fuel channel 86 have been contemplated, and include, but are not limited to, the use of a flotation device to interrupt the flow through the fuel channel and the use of electrical means to disrupt the fuel flow.

During vehicle refueling, the automatic refueling nozzle 20 is connected to the nipple interface 28 of the receiver 14. The nozzle 20 is then cocked open, to open the nipple poppet 32 inside the receiver by overcoming the biasing force of the first spring 40. With the inlet 24 open, fuel enters the receiver 14, and a portion of the fuel is directed up through the sensor fuel path 44 by means of the integrated Pitot tube 48 and jet pick up fitting 50, where the fuel flows through the sensor hose 52 leading to the sensor 16. The fuel is then channeled through the sensor 16 as described above, and returned through the return hose 54 and jet return fitting 56 into the second chamber 27. As fuel flows into the second chamber 27, the second chamber becomes pressurized, causing the piston shuttle 60 to open by overcoming the biasing force of the second spring 72. When the second chamber 27 is completely pressurized, the piston shuttle 60 opens completely allowing fuel to enter the fuel tank 10 via the main fuel path 74. At this point, any further flow through the return hose 54 and jet return fitting 56 is ceased, and flow across the cutout section 92 from the outlet orifice 90 to the inlet orifice 94 helps maintain the pressure. Fuel enters the fuel tank 10 as long as the piston shuttle 60 remains open. Once the fuel level reaches the sensor 16, the rising fuel 12 submerges and interrupts the fuel flow across the cutout section 92 of the sensor, and then the built up hydraulic head on the return fuel path 46 decreases. The piston shuttle 60 begins to close once the second spring 72 overcomes the pressure in the second chamber 27. As the piston shuttle 60 closes, back pressure builds up within the receiver body 22 and nozzle 20 interface, and fuel flow stops when the shutoff pressure is reached on the automatic shutoff-refueling nozzle. The fuel tank 10 does not sense any pressure as the pressure is only sensed within the receiver 14 and nozzle 20. Any undesired pressure in the fuel tank 10 is relieved by the vent 18. Once the automatic shutoff-refueling nozzle 20 closes, it cannot be reopened completely due to the interruption of the sensor 16 by the fuel level. Since the automatic shutoff-refueling nozzle is prevented from re-opening, fuel tank over-fill is also prevented.

From the above, it may be seen that the present invention provides a method and apparatus for fast fill refueling of vehicles without pressurizing the fuel tank. The refueling system also works in conjunction with an automatic shutoff refueling nozzle, so that when a desired level of fuel in the tank is detected by a sensor, refueling automatically ceases, thereby preventing tank over-fill. While a particular form of the invention has been illustrated and described it will also be apparent that various modifications can be made without departing from the spirit and scope of the invention. Accordingly, it is not intended that the invention be limited except as by the appended claims.

What is claimed is:

1. A refueling system, comprising:
   a fuel tank;
   a dual valve receiver connected in fluid communication with the fuel tank, the dual valve receiver having a receiver body with an inlet and an outlet, a first valve and a second valve, and a first chamber and a second chamber, the first chamber being connected in fluid communication with the inlet, the first valve disposed in said first chamber and biased to close the inlet, the inlet being connectable to a fuel supply, and the first valve operating to open the inlet when a fuel is received in the inlet from the fuel supply, the second valve connected to the second chamber, the second valve being biased to close the outlet and operating to open the outlet when the second chamber is pressurized;
   an automatic shutoff nozzle in fluid communication with a fuel source, wherein the automatic shutoff nozzle is removably connected to the dual valve receiver; and
   a jet sensor operatively connected to the fuel tank for sensing a predetermined level of fuel within the fuel tank, the jet sensor having a jet sensor passageway located at the predetermined level of fuel within the fuel tank, the jet sensor being connected in fluid communication between the receiver's first and second chambers, the jet sensor being operative to provide a flow of fuel from the first chamber to the second chamber to pressurize the second chamber when fuel is below the jet sensor passageway, and operative to not pressurize the second chamber when fuel is at or above the jet sensor passageway, whereby the dual valve receiver provides a flow of fuel to the first valve for directly opening the first valve in order for the fluid to pass through the jet sensor and into the second chamber of the dual receiver and activating the second valve to the valve open position to permit the fuel to flow through the dual receiver and into the fuel tank when fuel in the fuel tank is below the jet sensor passageway, and such that when the fuel in the fuel tank is at or above the jet sensor passageway the flow of fuel through the jet sensor is interrupted, so that the fuel is not permitted to flow through the outlet of the dual valve receiver, to thereby cause pressure inside the first chamber of the dual valve receiver and the automatic shutoff nozzle to increase to a predetermined threshold at which flow of fuel through the automatic shutoff nozzle is interrupted.

2. The refueling system of claim 1, further comprising a vent in fluid communication with the fuel tank.

3. A dual valve receiver used in conjunction with a fuel jet sensor for rapidly filling a fuel tank with a flow of fuel from an automatic shutoff nozzle removably connected to an inlet of the dual valve receiver, the dual valve receiver comprising:
   a receiver body having an inlet and an outlet and a main fuel path defined therebetween;
   a first chamber disposed in the receiver body and connected to receive fuel from the inlet;
   a first valve disposed inside the receiver body, the first valve being biased toward a closed position sealing the inlet, and movable between the closed position and an open position allowing fuel to flow from the inlet into the first chamber, the automatic shutoff nozzle directly opening the first valve;
   a second chamber disposed inside the receiver body to receive the fuel from the fuel jet sensor;
   a jet sensor fuel path from the inlet and the first valve through the fuel jet sensor to the second chamber, the jet sensor fuel path including a jet sensor passageway located at a predetermined fuel level in the fuel tank; and a second valve having an open position and a closed position, a first end and a second end, the first end disposed inside the second chamber, the first end of the second valve including a seal to prevent fuel from escaping from the inside of the second chamber, the second valve being biased toward the closed position with the second end sealing the outlet of the receiver body, the second valve being moveable from the closed position to the open position when fuel passes from the first valve through the fuel jet sensor to pressurize the second chamber of the dual valve receiver to activate the second valve to the open position, allowing the fuel to enter the fuel tank through the main fuel path, and the second valve being moveable from the open position to the closed position when a fuel level in the fuel tank reaches the jet sensor passageway, to thereby cause pressure inside the first chamber of the dual valve receiver and the automatic shutoff nozzle to increase to a predetermined threshold at which the flow of fuel through the automatic shutoff nozzle is interrupted.

4. A method for preparing a refueling system, comprising:

installing a dual valve receiver having a receiver body with a first chamber with a first valve and a second chamber with a second valve, to be in fluid communication with a fuel tank;

installing a jet sensor inside the fuel tank, the jet sensor including a jet sensor passageway located at a predetermined fuel level in the fuel tank;

connecting the jet sensor to receive fuel from the first chamber and direct the fuel to the second chamber, whereby the sensor detects when the fuel tank is full, causing the fuel flow to cease to prevent overfilling; and removably connecting an automatic shutoff nozzle to the dual valve receiver, the dual valve receiver providing a flow of fuel to the first valve for directly opening the first valve in order for the fluid to pass through the jet sensor and into the second chamber of the dual receiver and activating the second valve to the valve open position to permit the fuel to flow through the dual receiver and into the fuel tank, and causing flow of fuel from the automatic shutoff nozzle to be interrupted when a fuel level in the fuel tank reaches the jet sensor passageway, to thereby cause pressure inside the first chamber of the dual valve receiver and the automatic shutoff nozzle to increase to a predetermined threshold at which flow of fuel through the automatic shutoff nozzle is interrupted.

5. The method of claim 4, further comprising installing a vent to be in fluid communication with the fuel tank, whereby the vent prevents pressure build up in the fuel tank.

6. The method of claim 4, wherein the jet sensor passageway comprises a fuel channel and a cutout section exposing the fuel channel to the inside of the fuel tank.

7. A method for refueling a fuel tank, the fuel tank having a receiver having a receiver body including an inlet, an outlet, a first chamber with a first valve and a second chamber with a second valve, a jet sensor having a jet sensor passageway located at a predetermined fuel level in the fuel tank, a vent, and an automatic shutoff nozzle, comprising:

removably connecting the automatic shutoff nozzle to the inlet of the receiver, causing the first valve to open;

dispensing a fuel from the automatic shutoff nozzle into the first chamber of the receiver, the receiver providing a flow of fuel to the first valve for directly opening the first valve in order for the fuel to pass into the first chamber;

directing a portion of fuel from the first chamber to be channeled through the jet sensor, and into the second chamber to pressurize the second chamber, causing the second valve to open, and allowing the fuel from the automatic shutoff nozzle to flow through the receiver and into the fuel tank; and interrupting the fuel flow through the jet sensor to decrease pressure in the second chamber when the fuel level in the fuel tank reaches the jet sensor passageway, causing the second valve to close, which increases pressure inside the receiver and the automatic shutoff nozzle, to cause the automatic shutoff nozzle to automatically shut off to prevent over-pressurization and over-filling of the fuel tank.

* * * * *